United States Patent
Raghuchandra et al.

(10) Patent No.: US 11,611,218 B2
(45) Date of Patent: Mar. 21, 2023

(54) METHODS AND SYSTEMS FOR POWER CONTROL IN A NON-EXPORTING MODE OF OPERATION

(71) Applicant: VESTAS WIND SYSTEMS A/S, Aarhus N. (DK)

(72) Inventors: Karthikeya Balladi Raghuchandra, Aarhus N (DK); Chris Damgaard, Herning (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/881,305

(22) Filed: Aug. 4, 2022

(65) Prior Publication Data
US 2023/0054556 A1    Feb. 23, 2023

(51) Int. Cl.
*H02J 3/38* (2006.01)
*H02J 3/46* (2006.01)

(52) U.S. Cl.
CPC ............ *H02J 3/381* (2013.01); *H02J 3/46* (2013.01); *H02J 2300/28* (2020.01)

(58) Field of Classification Search
CPC ........... H02J 3/381; H02J 3/46; H02J 2300/28
See application file for complete search history.

(56) References Cited

U.S. PATENT DOCUMENTS

| | | | | |
|---|---|---|---|---|
| 2005/0225090 A1* | 10/2005 | Wobben | ............... | H02J 3/32 290/44 |
| 2009/0229288 A1* | 9/2009 | Alston | ............... | B60H 1/00428 62/239 |
| 2015/0260463 A1* | 9/2015 | Laughlin | ............... | F01K 13/02 165/104.31 |
| 2017/0074244 A1* | 3/2017 | Huang | ............... | F03D 17/00 |
| 2017/0284369 A1 | 10/2017 | Chen et al. | | |
| 2018/0179917 A1* | 6/2018 | Apte | ............... | F01D 15/10 |
| 2020/0166017 A1* | 5/2020 | Hansen | ............... | F03D 9/11 |
| 2020/0400120 A1* | 12/2020 | Brogan | ............... | F03D 9/007 |

FOREIGN PATENT DOCUMENTS

| | | |
|---|---|---|
| CN | 111614124 A | 9/2020 |
| WO | 2020094752 A1 | 5/2020 |
| WO | 2021148096 A1 | 7/2021 |

OTHER PUBLICATIONS

Danish Patent and Trademark Office, 1st Technical Examination including the Search Report for Application PA 2021 70414 dated Feb. 12, 2022.
European Patent Office, Extended Eurpean Search Report for Application 22187149.4-1202 dated Jan. 27, 2023.

* cited by examiner

*Primary Examiner* — Ziaul Karim
(74) *Attorney, Agent, or Firm* — Patterson + Sheridan, LLP

(57) ABSTRACT

Aspects of the present invention relate to controlling a renewable energy power plant comprising a plurality of wind turbine generators (WTG)s and an energy storage system (ESS). A method includes: controlling the plurality of WTGs to stop generating power, and thereby to enter a non-exporting mode of operation of the renewable energy power plant, during which one or more auxiliary systems of the renewable energy power plant are powered to maintain at least one of the plurality of WTGs in a standby state, operable to start generating power upon demand; wherein the one or more auxiliary systems are powered during the non-exporting mode of operation.

15 Claims, 5 Drawing Sheets

METHODS AND SYSTEMS FOR POWER CONTROL IN A NON-EXPORTING MODE OF OPERATION

TECHNICAL FIELD

The present disclosure relates to methods and systems for controlling a renewable energy power plant in a non-exporting mode of operation.

BACKGROUND

In conventional wind farms comprising a plurality of wind turbines, general challenges arise when power generation is stopped in a non-exporting mode of operation.

Power generation of a wind farm is typically stopped or interrupted upon entering a net-zero mode of operation, during which no energy is transferred to/from the wind farm, and/or in response to entering an island mode of operation following disconnection of the wind farm from a main grid. The term "island mode" relates to an operation without connection to a main grid, for example following a grid disruption, whilst the term "net-zero mode" relates to an operation without energy transfer to/from the wind farm, though the connection to the grid may remain. For example, a net-zero mode of operation may be executed due to technical compliance/grid code requirements or due to a high tariff being applied for electricity consumed from the main grid.

During non-exporting modes of operation, the wind farm stops generating power but it is desirable to maintain the plurality of wind turbines in a standby state, ready for start-up (i.e. ready to selectively re-enter a power exporting, or producing, mode of operation of the wind farm) upon demand. However, maintaining the plurality of wind turbines in the standby state requires a supply of electrical power that would ordinarily be provided by the main grid. In the absence of energy transfer from the main grid, it is therefore difficult to sustain wind turbine connection without power tripping or quality problems.

In order to independently perform a start-up or black start, it is known to provide diesel generators in the wind farm, which supply the necessary electrical energy to the wind turbines. However, the diesel generators are disadvantageous for several reasons, including that they require a supply of fuel.

It is an aim of the present invention to address one or more of the disadvantages associated with the prior art.

SUMMARY OF THE INVENTION

According to an aspect of the invention there is provided a method of controlling a renewable energy power plant comprising a plurality of wind turbine generators (WTG)s and an energy storage system (ESS). The energy storage system may comprise, or take the form of, a battery energy storage system (BESS), a flow battery, a compressed air energy storage system, and/or a flywheel, for example. The method comprises: controlling the plurality of WTGs to stop generating power, and thereby to enter a non-exporting mode of operation of the renewable energy power plant, during which one or more auxiliary systems of the renewable energy power plant are powered to maintain at least one of the plurality of WTGs in a standby state, operable to start generating power upon demand. In an example, the one or more auxiliary systems may be powered to maintain all of the WTGs in the standby state during the non-exporting mode of operation.

The one or more auxiliary systems are powered during the non-exporting mode of operation by: discharging stored energy from the energy storage system; detecting when a first energy storage condition is satisfied; operating one or more of the WTGs to start generating power in dependence on detecting that the first energy storage condition is satisfied, the power generated by the one or more WTGs being used to power the one or more auxiliary systems; operating the energy storage system to recharge using the power generated by the one or more WTGs; detecting when a second energy storage condition is satisfied; and operating the one or more WTGs to stop generating power in dependence on detecting that the second energy storage condition is satisfied.

Advantageously, during the non-exporting mode of operation, energy is therefore discharged from the energy storage system, such as the BESS, until the energy store is substantially depleted (i.e. until the first energy storage condition is satisfied), at which point one or more of the WTGs are operated to start generating power from the standby state in order to make up for the shortfall in power supply to the one or more auxiliary systems. Surplus power generated by the one or more WTGs is advantageously transferred to the energy storage system, which acts like a buffer, where the surplus power is used to recharge, or otherwise replenish, the store of available energy. Once the second energy storage condition is satisfied, indicating that the energy storage system is recharged, power generation from the one or more WTGs is stopped and the one or more auxiliary systems are powered by discharging energy from the energy storage system once again in a subsequent cycle. In this manner, the WTGs are only operated for short, temporary, periods, whilst the energy storage system is recharged, such that the mechanical loading and/or fatigue effects can be minimised at the WTGs.

The energy storage system may therefore be cyclically discharged, and recharged by a selection of WTGs, in order to power the one or more auxiliary systems and maintain each, or at least one, of the plurality of wind turbines in the standby state throughout the non-exporting mode of operation. As a result, wind turbine connection is sustained during the non-exporting mode of operation without power tripping, or quality, problems such that a black-start or an independent start-up of the renewable energy power plant can be performed without a diesel generator.

It shall be appreciated that the energy storage system may take various suitable forms for this purpose and so by 'charging' it is intended to mean that energy is transferred to the energy storage system for storage, i.e. to increase the state of charge or amount of energy stored, and by 'discharging' it is intended to mean that energy is transferred from the energy storage system to power the one or more auxiliary systems, reducing the state of charge/amount of energy stored.

It shall also be appreciated that the one or more auxiliary systems of the renewable energy power plant that are powered during the non-exporting mode of operation include those auxiliary systems whose operation is required to maintain at least one, but preferably each, of the WTGs in the standby state. Such auxiliary systems may include systems within each WTG, balance of plant (BOP) equipment in the renewable energy power plant, and/or grid connection equipment. For example, the auxiliary systems may typically include systems for controlling yaw, bearing lubrication, hydraulic pumps, and de-icing systems, as well as wind measurement systems, such as LIDARs, and met masts, amongst other systems.

Optionally, detecting that the first energy storage condition is satisfied comprises detecting that at least one of: a discharge period has elapsed; and/or the energy stored in the energy storage system has reduced to a first threshold state of charge or amount of available energy.

Optionally, detecting that the second energy storage condition is satisfied comprises detecting that at least one of: a duty period for the one or more WTGs has elapsed; and/or the energy storage system has recharged to a second threshold state of charge or amount of available energy.

In an example, the second threshold state of charge may be a maximum charge capacity of the energy storage system, i.e. a maximum energy storage capacity.

In an example, the method may further comprise at least one of: stopping the discharge of stored energy from the energy storage system when the power generated by the one or more WTGs is greater than, or equal to, the power demand of the one or more auxiliary systems; and/or resuming the discharge of stored energy from the energy storage system when the power generated by the one or more WTGs is less than the power demand of the one or more auxiliary systems.

In an example, the method further comprises curtailing the one or more WTGs that are operated to generate the power for recharging the energy storage system and powering the auxiliary load.

Optionally, curtailing the one or more WTGs comprises: determining an average power demand of the one or more auxiliary systems; and determining and dispatching active power set points for controlling the one or more WTGs, the set points being determined based, at least in part, on the determined average power demand.

In an example, the method further comprises selecting which one or more WTGs of the plurality of WTGs to operate so as to start generating power. The selection may, for example, be made based on at least one of the following for each WTG: information that is indicative of available power at the WTG; and/or information that is indicative of a fatigue life of the WTG. The information that is indicative of available power at the WTG may, for example, comprise a wind speed and/or a wind direction at the WTG.

The information that is indicative of the fatigue life of the WTG may, for example, comprise at least one of: a load cycle history of the WTG; a fatigue limit of the WTG; and/or a load capacity of the WTG.

Optionally, the renewable energy power plant is controlled to cyclically discharge the energy storage system and to recharge the energy storage system using the selected one or more WTGs, and thereby to power the one or more auxiliary systems during the non-exporting mode of operation.

Optionally, for each successive cycle, the method may comprise selecting another one or more WTGs of the plurality of WTGs to operate so as to start generating power.

In an example, the method may further comprise: initiating the non-exporting mode of operation in dependence on entering: an island mode of operation following disconnection of the renewable energy power plant from a power network; and/or a net-zero mode of operation.

Optionally, the method further comprises selectively operating the at least one WTG from the standby state to black-start the renewable energy power plant, and thereby to re-enter a producing mode of operation.

According to another aspect of the invention there is provided a power plant controller configured to perform the method described in a previous aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
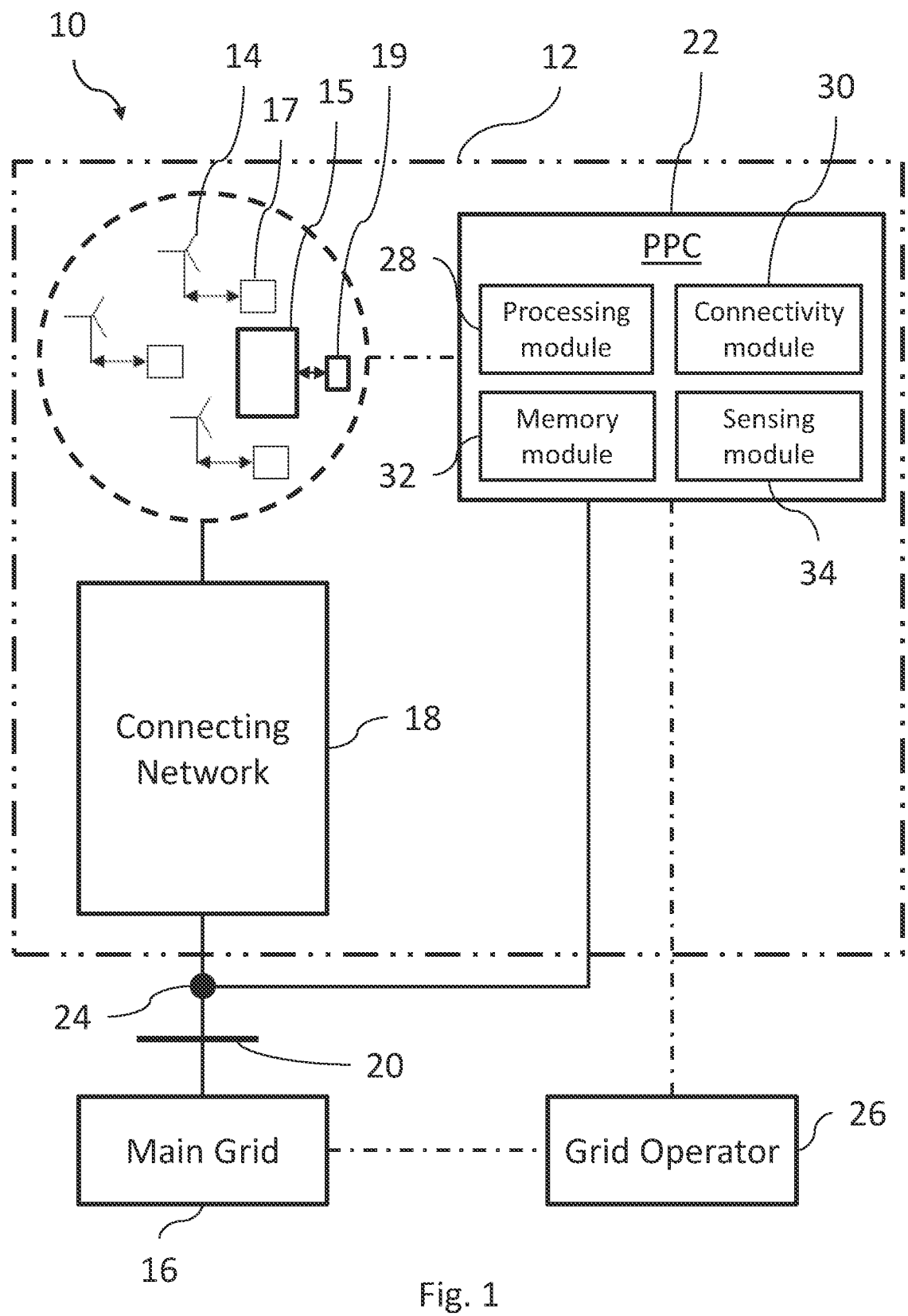
FIG. 1 shows a power network including a renewable energy power plant and a power plant controller.

Generally, the present application relates to methods and systems for controlling a renewable energy power plant comprising a plurality of wind turbines and an energy storage system, such as a battery energy storage system (BESS). In particular, the present application relates to methods and systems for controlling the renewable energy power plant, when the plurality of wind turbines are controlled to stop generating power as part of a non-exporting mode of operation of the plant. The non-exporting mode of operation may be initiated upon entering a net-zero mode of operation and/or in response to disconnection of the wind farm from a main grid (i.e. upon entering an island mode of operation), for example.

Advantageously, during the non-exporting mode of operation of the plant, auxiliary system(s) of the plant continue operating to maintain at least one, but preferably all, of the wind turbines in a standby state, ready to start generating power upon demand. In this manner, wind turbine connection can be maintained for grid forming purposes, allowing the plant to re-enter a power producing mode of operation upon demand. However, the operation of the auxiliary system(s) requires a supply of electrical power.

The present application provides advantageous methods and systems for powering the auxiliary system(s) during the non-exporting mode of operation of the plant. In particular, upon entering the non-exporting mode of operation, the method is advantageously arranged to control the energy storage system to discharge stored energy and power the auxiliary system(s), thereby maintaining at least one of the plurality of wind turbines in the standby state, preferably maintaining all of the wind turbines in the standby state. To ensure that the operation of the auxiliary system(s) remains uninterrupted, the method also involves monitoring an energy storage condition as energy is discharged from the energy storage system. Upon detecting that a first energy storage condition is satisfied (e.g. upon detecting that the BESS has discharged to a lower threshold state of charge), the method selectively operates one or, if necessary, more of the wind turbines to start generating power from the standby state, with the generated power being used to power the auxiliary load and to recharge the energy storage system. The selected wind turbine(s) are only operated in this manner temporarily though, with such operation being minimised in order to mitigate mechanical loading and/or fatigue effects. Hence, upon detecting that a second energy storage condition is satisfied (e.g. when a second threshold state of charge is reached), the one or more wind turbines are operated so as to stop generating power, with the auxiliary system(s) being powered, once again, by the energy storage system.

In this manner, the energy storage system may be cyclically discharged, and recharged by a selection of wind turbine(s), to power the auxiliary system(s) and thereby to maintain each, or at least one, of the plurality of wind turbines in the standby state throughout the non-exporting mode of operation.

Advantageously, the wind turbines are therefore ready to black-start the renewable energy power plant (i.e. to re-enter the power producing mode of operation), upon demand. As shall be described in more detail in the following description, different wind turbines may be selectively operated for each respective charge cycle so as to effectively share the fatigue effects throughout the plurality of wind turbines during the non-exporting mode of operation.

FIG. 1 illustrates an example architecture in which a renewable energy power plant, such as a wind power plant (WPP), is connected to a main grid as part of a wider power network. As will be understood by the skilled reader, a WPP comprises at least one wind turbine generator (WTG), and is also known as a wind park or a wind farm. A WTG is commonly referred to as a wind turbine and, in embodiments of the present invention, it shall be appreciated that the WPP may include an energy storage system, such as a battery energy storage system (BESS) that is configured to provide an uninterruptible power supply for the WPP.

The example shown in FIG. 1 is representative only though and the skilled reader will appreciate that other specific architectures are possible. For example, the power plant may include other energy storage systems and/or renewable energy sources, such as a solar power plant, a bio energy power plant, an ocean/wave/tidal energy plant, or a hybrid power plant having a combination of different types of renewable energy power plants. Thus, the invention also relates to renewable energy power plants and renewable energy generators in general, rather than being exclusive to wind power plants and generators as in the figures.

The components of the wind power plant and the power network are conventional and as such would be familiar to the skilled reader. It is expected that other known components may be incorporated in addition, or as alternatives, to the components shown and described in FIG. 1. Such changes would be within the capabilities of the skilled person.

FIG. 1 shows a power network 10 incorporating a WPP 12. In this example, the WPP 12 includes a plurality of WTGs 14, a BESS 15 and a power plant controller 22, referred to hereafter as PPC 22. Each of the plurality of WTGs 14 converts wind energy into electrical energy, which is ordinarily transferred from the WPP 12 to a main transmission network or main grid 16, as active power and/or current, for distribution. Individual generators may each be referred to as a 'unit' in this description.

Although not illustrated in this Figure, the WPP 12 may also include compensation equipment, such as a static synchronous compensator (STATCOM) or another type of synchronous compensator, configured to provide reactive power or reactive current support as required.

Figure 2:
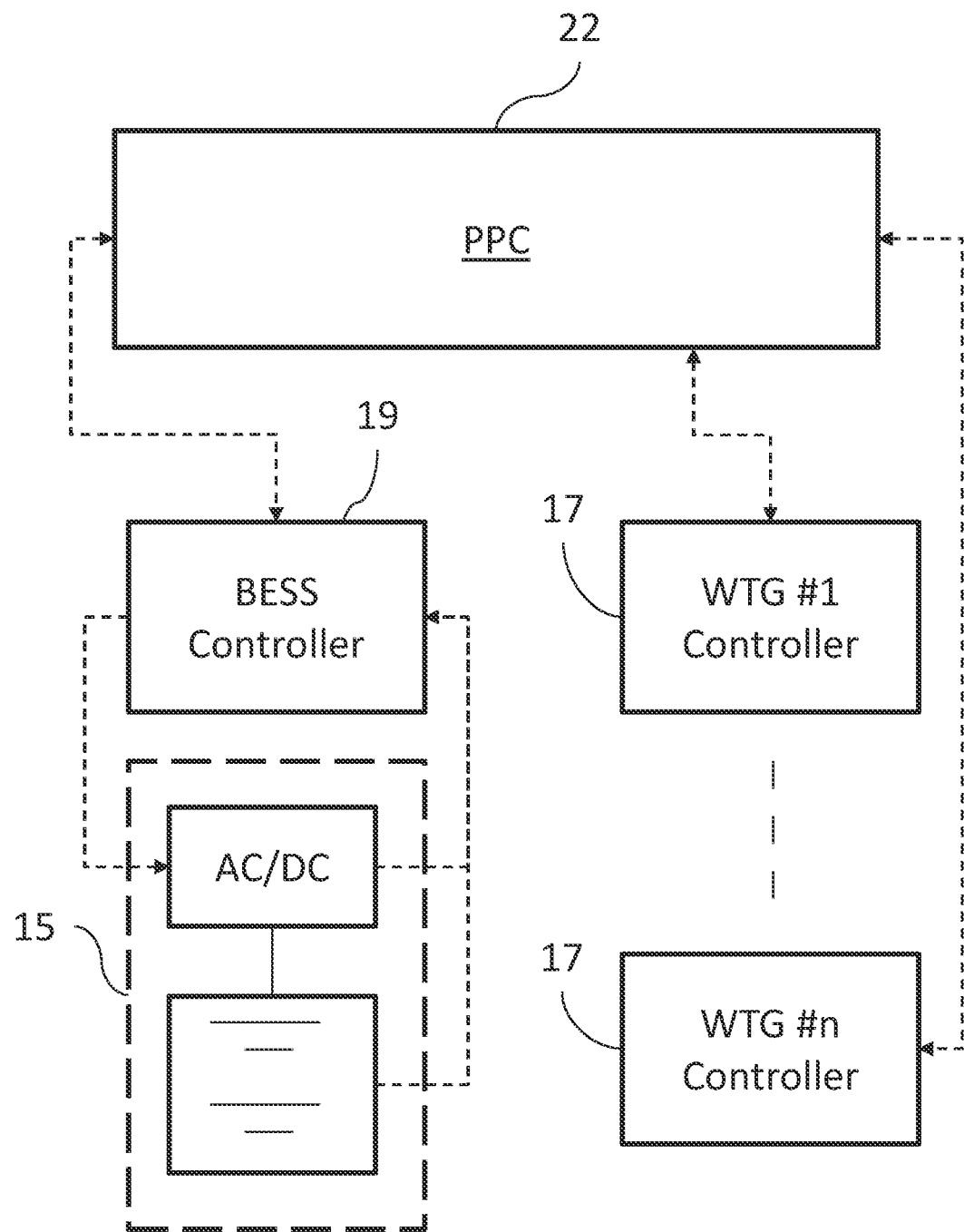
FIG. 2 shows a system diagram of the power plant controller of FIG. 1 according to an embodiment of the invention.

As shown in FIGS. 1 and 2, each of the WTGs 14 is associated with a respective WTG controller 17. In some examples, a set of WTGs may share a single, semi-centralised WTG controller, such that there are fewer WTG controllers than WTGs. As would be understood by the skilled person, WTG controllers 17 can be considered to be computer systems capable of operating a WTG 14 in the manner prescribed herein, and may comprise multiple modules that control individual components of the WTG or just a single controller. The computer system of the WTG controller 17 may operate according to software downloaded via a communications network or programmed onto it from a computer-readable storage medium.

The WTG controllers 17 operate the respective WTGs 14 to implement active and reactive current, and/or power, requests received from the PPC 22. Additionally, the PPC 22 can take external inputs (e.g. from a Condition Monitoring System) to select respective WTGs 14 for operation based on the health parameters of the WTGs 14, as shall be described in more detail.

The BESS 15 acts as an energy storage system that provides an uninterruptible power supply when the WPP 12 is controlled to enter a non-exporting mode of operation and the WTGs 14 are controlled to stop generating power as part of that non-exporting mode of operation. As shall be described in more detail in the following description, the WPP 12 may be controlled in such manner in response to disconnection of the WPP 12 from the main grid 16 (i.e. upon entering an island mode of operation), for example.

For this purpose, the BESS 15 stores energy that may be selectively discharged to power one or more auxiliary systems of the WPP 12 during the non-exporting mode of operation. In particular, the BESS 15 stores energy that may be discharged to power those auxiliary systems whose operation is required to maintain at least one, but preferably each, of the WTGs 14 in a standby state, ready to start generating power upon demand. Such auxiliary systems may include systems within each WTG 14, balance of plant (BOP) equipment in the WPP 12, and/or grid connection equipment. For example, the auxiliary systems may typically include systems for controlling yaw, bearing lubrication, hydraulic pumps, and de-icing systems, as well as wind measurement systems, such as LIDARs and met masts, amongst other systems.

Although not described in detail, it shall be appreciated that the equipment of the WPP 12 may include one or more transformers, power networks, or other systems (not shown) for aggregating the electrical loads of the auxiliary systems and that, in combination with the associated power losses, such aggregated electrical loads form an auxiliary load or power demand. For the sake of clarity, herein any reference to the 'auxiliary load' is intended to mean the power demand arising from the operation of those auxiliary systems whose operation is required to maintain the WTGs 14 in the standby state, accounting for any associated power losses.

By using the BESS 15 in the manner described, individual uninterruptible power supplies at each WTG 14 can be removed or otherwise restricted to powering safety critical systems such as the WIG controller 17, pitch system and/or emergency systems.

For this purpose, the BESS 15 may comprise a battery or multiple batteries, in particular rechargeable batteries, providing centralised or semi-centralised energy stores for the WPP 12. In other examples, it shall be appreciated that other energy storage systems may be implemented in addition, or as an alternative to the BESS 15, such as a flow battery, an accumulator, or a fly wheel system, for example.

The energy storage system may also be associated with a respective controller. For example, the BESS 15 may also be associated with a BESS controller 19, in this example. In a similar manner to the WTG controllers 17, the BESS controller 19 can be considered to be a computer system capable of operating the BESS 15 in the manner prescribed herein, and may comprise multiple modules that control individual components of the BESS 15 or just a single controller. The computer system of the BESS controller 19 may operate according to software downloaded via a communications network or programmed onto it from a computer-readable storage medium.

The BESS controller 19 operates the BESS 15 to accumulate, and to discharge, electrical power, for example by implementing active current, and/or power, requests received from the PPC 22, or otherwise operating in an island forming mode of operation. As shall be described in more detail, the BESS controller 19 also monitors the health condition of the BESS 15 in order to calculate the available energy at the BESS 15 to be relayed back to the PPC 22.

As shown in FIG. 1, the WPP 12 also includes a connecting network 18 for connecting the WPP 12 to the main grid 16. In this example, the WPP 12 and the main grid 16 are connected at a Point of Interconnection (PoI) 20, which is an interface between the WPP 12 and the main grid 16. The PoI 20 may also be referred to as the Point of Common Connection, which may be abbreviated to 'PCC' or 'PoCC'. For the sake of clarity, the PCC is also the point of measurement where "net zero operation" is measured.

It shall be appreciated that, in a non-exporting mode of operation, no energy is output from the WPP 12. Furthermore, upon disruption of the grid 16, or the connection thereto, the WPP 12 may form a self-contained micro-grid, or island, which terminates at the PoI 20, causing the WPP 12 to enter the non-exporting mode of operation. Alternatively or additionally, the non-exporting mode of operation may, for example, be initiated upon entering a net-zero mode of operation during which no energy transfer occurs between the WPP 12 and the main grid 16, whilst the grid connection remains.

As shown in FIGS. 1 and 2, the PPC 22 is connected to the main grid 16 at a Point of Measurement (PoM) 24 and further connects to the WTG controllers 17 and the BESS controller 19 of the WPP 12.

The role of the PPC 22 is generally to act as a command and control interface between the WPP 12 and the grid 16, and more specifically, between the WPP 12 and a grid operator 26, such as a transmission system operator (TSO) or a distribution system operator (DSO). The WPP 12 is therefore capable of altering its power or current output in reaction to commands received from the PPC 22.

Upon entering the non-exporting mode of operation, the PPC 22 is configured to control the energy storage system, such as the BESS 15, and the WTGs 14 to power the auxiliary load required to maintain each WTG 14, or a selection of the WTGs 14, in the standby state.

To provide such control, the PPC 22 may, for example, be configured to generate and sends dispatch signals to the WTG controllers 17 and/or the BESS controller 19. For example, the BESS controller 19 may control the BESS 15, and/or the WTG controllers 17 may control respective WTGs 14, according to commands or set points contained within the dispatch signals.

For this purpose, the PPC 22 may incorporate a processing module 28, a connectivity module 30, a memory module 32 and a sensing module 34, for example, as shown in FIG. 1.

During the non-exporting mode of operation, the connectivity module 30, the memory module 32, and/or the sensing module 34 are configured to provide the processing module 28 with one or more measurement signals comprising information that is indicative of various parameters for controlling the WPP 12.

For example, such measurement signals may comprise information that is indicative of: the available energy at the energy storage system, such as a state of charge of the BESS 15; power levels, current levels and/or voltage levels of any of the BESS 15, the WTGs 14, and/or the WPP 12; and/or the available power at the WTGs 14, such as a wind speed and/or a wind direction at each of the WTGs 14, as shall be described in more detail below.

The sensing module 34 may, for example, receive such measurement signals directly from one or more connected sensors (e.g. at the PoM 24, the BESS 15 and/or the WTGs 14) and communicate the information to the processing module 28. Alternatively, or additionally, the information may be determined by one or more systems that are connected to the connectivity module 30, such as the WTGs controllers 17 and/or the BESS controller 19, and the information may be communicated, in turn, through the connectivity module 30 to the processing module 28. In each case, the determined information may also be stored permanently, or temporarily, in the memory module 32, from which it may be recalled, on demand, by the processing module 28. The PPC 22 may also receive information regarding the grid 16 and/or the local buses, substations and networks from an energy management system (not shown).

Based on such information, the PPC 22 is configured to operate a control scheme, or algorithm, for powering the auxiliary systems, and thereby maintaining the WTGs 14 in the standby state, during the non-exporting mode of operation.

Considered in more detail, the processing module 28 is configured to control the BESS 15 to discharge stored energy to power the auxiliary load of the WTGs 14 and, whilst the BESS 15 is discharging energy, to detect when a first energy storage condition is satisfied.

The first energy storage condition is indicative of the remaining available energy at the energy storage system and the need to operate one or more of the WTGs 14 to start generating power. By way of example, the first energy storage condition may be satisfied once a discharge period has elapsed and/or when the energy stored in the BESS 15 falls to a first threshold state of charge. Here, the discharge period may be a predetermined period for discharging the BESS 15 based on the state of charge of the BESS 15 and/or a rate of discharge of the BESS 15, for example. The first threshold state of charge may, for example, be a lower threshold state of charge.

The first energy storage condition, the discharge period and/or the first threshold state of charge may each be stored as parameters in the memory module 32. For example, the memory module 32 may include a look-up table of respective discharge periods and/or threshold states of charge for use in respective conditions (i.e. wind conditions or conditions of the grid 16) or modes of operation, such as a net-zero mode of operation and/or an island mode of operation. In particular, the look-up table may include a discharge period, and/or a first threshold state of charge, for operation when the WPP 12 is disconnected from the main grid 16, in an island mode, and another discharge period, and/or threshold state of charge, when the WPP 12 remains connected to the main grid 16 during a net-zero mode of operation. Each of these parameters may be selectively recalled by the processing module 28 in dependence on the current conditions and/or mode of operation.

The processing module 28 is also configured to operate one or more of the WTGs 14 to start generating power when the first energy storage condition is satisfied and to stop generating power when a second energy storage condition is satisfied. Here, the power generated by the WTGs 14 is used to recharge the energy storage system and to simultaneously power the auxiliary load.

The second energy storage condition is indicative of the available energy stored in the energy storage system, such as the extent to which the BESS 15 has recharged. By way of example, the second energy storage condition may therefore be satisfied once a duty period for the operated WTG(s) 14 has elapsed and/or when the energy stored in the BESS 15 reaches a second threshold state of charge. For example, the duty period may be a predetermined period for operating a respective WTG 14, which may be determined based on the available power at the WTG 14, or usage factors associated with the WTG 14, such as a fatigue life estimate for the WTG 14. The second threshold state of charge may be an upper, or a maximum, threshold state of charge of the BESS 15, for example. Each of the second energy storage condition, the duty period and/or the second threshold state of charge may similarly be stored in the memory module 32. For example, the memory module 32 may include a look-up table of respective duty periods for respective WTGs 14 and/or threshold states of charge for use in respective conditions (i.e. wind conditions or conditions of the grid 16) or modes of operation, such as the island mode of operation and/or the net-zero mode of operation.

In this manner, the PPC 22 may, for example, selectively operate the BESS 15 and the WTG(s) 14 in a duty cycle, to maintain the WTGs 14 in the standby state during the non-exporting mode of operation, as shall be described in more detail.

In examples, the processing module 28 may also be configured to select one or more of the WTGs 14 to operate when the first energy storage condition is satisfied. For example, the processing module 28 may include a rule, scheme, or algorithm for selecting one or more of the WTGs 14 to operate based on information relating to the available power at each of the WTGs 14 (for example using wind speed and/or wind direction measurements), the auxiliary load of the WTGs 14 (i.e. the power demand of the auxiliary system(s)), and/or usage factors associated with the WTG 14, including the condition or fatigue life of each of the WTGs 14. For example, the memory module 32 may store information that is indicative of the health, or usage, of each of the WTGs 14 including, for example, an estimate of the fatigue life of the WTG; a load cycle history of the WTG; a fatigue limit of the WTG; and/or a load capacity of the WTG. For this purpose, the PPC 22 may also comprise, or have access, for example via the memory module 32, to a look-up table or algorithm for determining which of the WTG(s) 14 to operate based on such information. Alternatively or additionally, the PPC 22 may receive such information from a dedicated condition monitoring system.

The operation of the WPP 12 in a non-exporting mode of operation shall now be described with additional reference to FIGS. 3 to 5.

Figure 3:
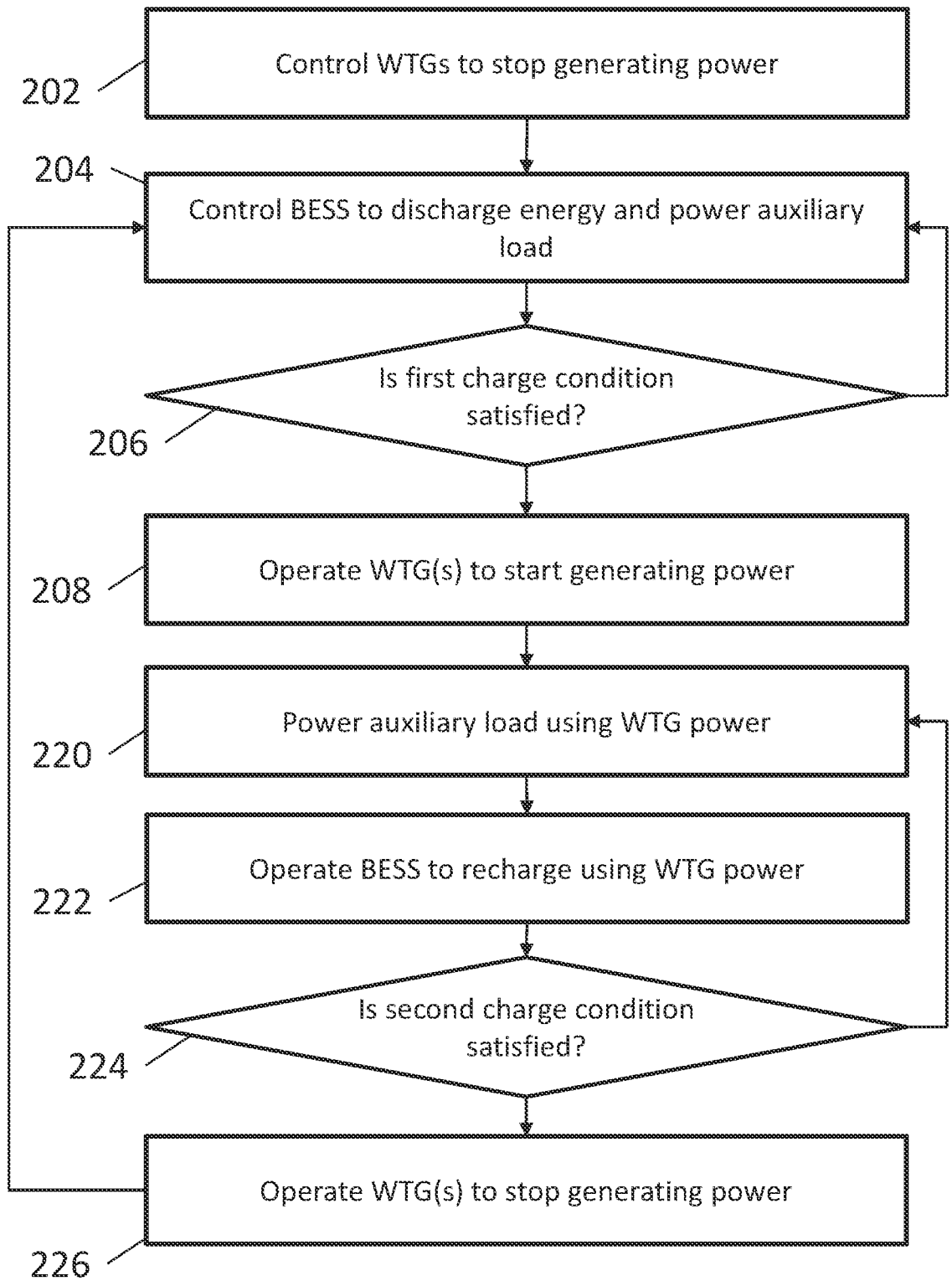
FIG. 3 shows a method of operating the power plant controller of FIG. 2 according to an embodiment of the invention.

FIG. 3 shows an example method 200 of controlling the WPP 12, in accordance with an embodiment of the invention.

During the operation of the WPP 12, there may be a need to enter a non-exporting mode of operation and therefore to stop generating power from the WPP 12. For example, the power demand of the WPP 12 may be removed upon disconnection of the wind farm from a main grid (i.e. upon entering an island mode of operation), such that there is a sudden reduction in power demand leading to a need to stop generating power from the WTGs 14 and to enter a non-exporting mode of operation for safety purposes.

Accordingly, in step 202, the PPC 22 may detect such conditions, for example via measurements at the PoM 24, and control the WTGs 14 accordingly to stop generating power and thereby to enter a non-exporting mode of operation. Upon entering the non-exporting mode of operation, the auxiliary systems of the WPP 12 are powered to maintain at least one, preferably more or all, of the WTGs 14 in the standby state, ready to start generating power upon demand. In this manner, the WPP 12 can be selectively operated to re-enter the power producing mode of operation, for example in response to reconnection to the main grid 16.

However, during the non-exporting mode of operation, the aggregated power demand of the auxiliary systems forms an auxiliary load, requiring a source of electrical power.

Accordingly, in step 204, the PPC 22 controls the energy storage system, i.e. the BESS 15 in this example, to start discharging stored energy to power the auxiliary load. In this manner, the auxiliary systems of the WTGs 14 and/or the WPP 12 are supplied with sufficient power to maintain the WTGs 14 in the standby state. For example, yaw systems of the WTGs 14 may control the yaw of the WTGs 14 to face the wind, based on wind direction measurements, ready to start generating power upon demand.

Such control may be implemented via the BESS controller 19. For example, the PPC 22 may dispatch commands to the BESS controller 19 to control the energy discharge from the BESS 15 such that the auxiliary system(s) are able to draw sufficient power for maintaining the WTGs 14 in the standby state.

In step 206, the PPC 22 determines whether the first energy storage condition associated with the energy storage system is satisfied. For example, the PPC 22 may determine whether the state of charge of the BESS 15 has reduced to the first threshold state of charge, and/or whether the BESS 15 has been discharging energy for the prescribed discharge period. For example, the PPC 22 may record the time elapsed whilst the BESS 15 is discharging energy sufficient to power the auxiliary systems (i.e. meeting the auxiliary load) and determine whether the first battery charging condition is satisfied in dependence on the discharge period having elapsed. As mentioned previously, the discharge period may be stored in the memory module 32 of the PPC 22 and correspond to an energy storage capacity and/or discharge rate of the BESS 15, for example.

Whilst the first energy storage condition remains unsatisfied, the PPC 22 may continue to control the BESS 15, via the BESS controller 19, to discharge stored energy to power the auxiliary load, as described in step 204.

However, once the PPC 22 detects that the first charge condition is satisfied, the PPC 22 may proceed to operate one or, if necessary, more of the WTGs 14 to start generating power, in step 208.

As shall be described in more detail below, the power generated by the one or more WTGs 14 is used to power the auxiliary load (maintaining the remaining WTGs 14 in the standby state), whilst also providing surplus power to the energy storage system, for example recharging the BESS 15. However, as the WPP 12 is operating in a non-exporting mode of operation, excess power generation is unsafe. Hence, the number of WTGs 14 operated, the duration of such operation and the amount of power produced will be controlled by the PPC 22.

It shall therefore be appreciated that the WPP 12 may use one or methods for controlling the one or more WTGs 14 to start generating power.

Figure 4:
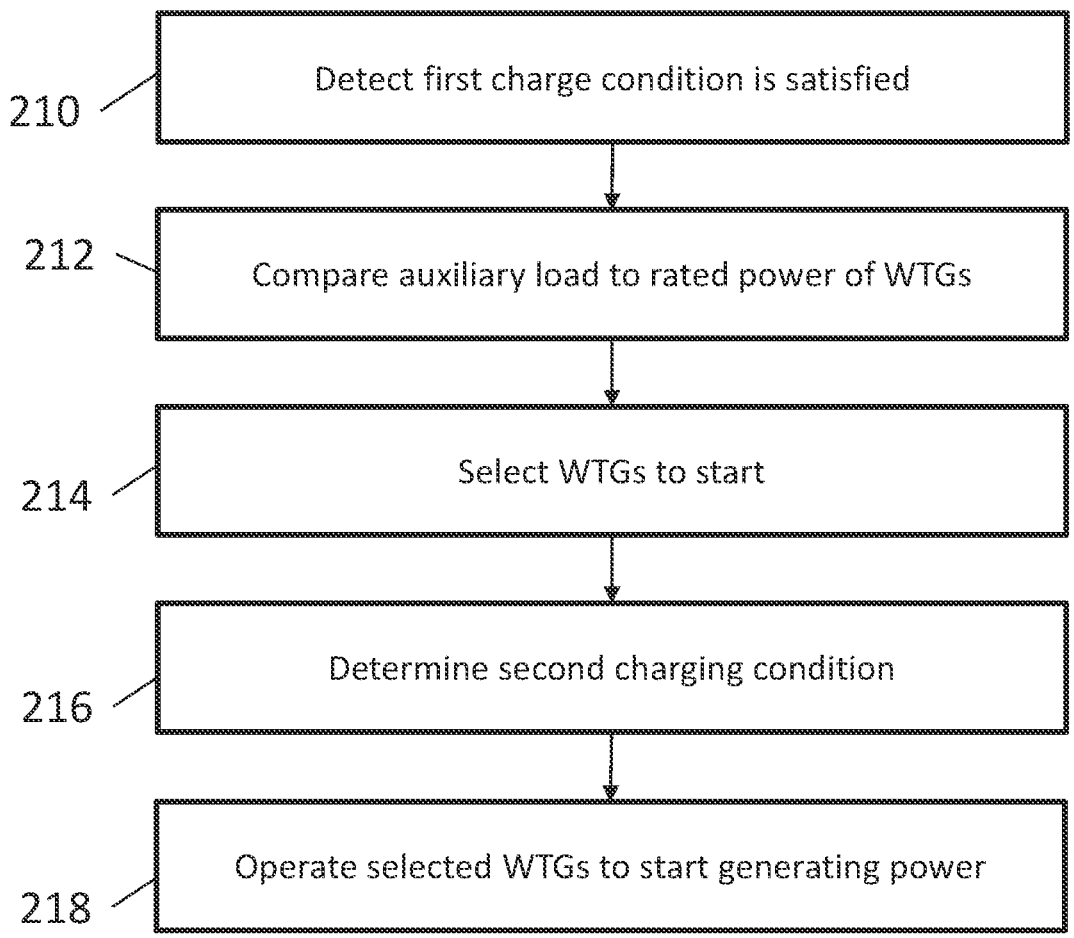
FIG. 4 shows example sub-steps of the method of FIG. 3 according to an embodiment of the invention.

To give an example, the method 200 may include substeps 210 to 218, as shown in FIG. 4, for controlling the WTGs 14 for this purpose, as shall now be described in more detail.

In sub-step 210, the PPC 22 may detect that the first energy storage condition has been satisfied.

In sub-step 212, the PPC 22 may determine that the power demand associated with the auxiliary load and recharging the BESS 15 is less than the rated power output for any one of the WTGs 14. In other words, the PPC 22 may determine that the power demand is so low that it would require curtailed operation of any one of the WTGs 14. Notably such curtailed operation is known to incur significant mechanical loads and fatigue damage. For this purpose, the PPC 22 may receive or otherwise determine a value of the power demand, for example using an estimate of the average auxiliary load necessary to power the auxiliary systems, and determine corresponding power levels, or corresponding set points, that may be less than rated power output for any one of the WTGs 14.

Hence, in sub-step 214, the PPC 22 may select one of the WTGs 14 to start based on the auxiliary load of the WPP 12, as well as information relating to the available power at each of the WTGs 14, and/or information relating to the condition or fatigue life of each of the WTGs 14. The information relating to the available power at each of the WTGs 14 may be determined based on measurements signals indicative of the wind speed and/or wind direction, received at the PPC. The PPC 22 may determine the information relating to the condition or fatigue life of each of the WTGs 14 by accessing information stored in the memory module 32, for example. On this basis, the PPC 22 may for example, select one of the WTGs 14 where the estimated available power is greater than the power demand, with the selected WTG 14 having a fatigue life estimate that is larger than the other WTGs 14. In other non-limiting examples, the PPC 22 may, for example select the one or more of the WTGs 14 having the highest load capacity, where the available power is a minimum or a maximum, and/or having performed the least amount of duty cycles or accumulated the least amount of damage.

In sub-step 216, the PPC 22 may also determine the second energy storage condition associated with the BESS 15 or the selected WTG 14. For example, the second energy storage condition may be a second threshold state of charge and/or a duty period for operating the selected WTG 14, which may be determined by retrieval from the memory module 32.

In sub-step 218, the PPC 22 proceeds to control the selected WTG(s) 14 to start generating power. For example, the PPC 22 may determine set points for controlling the active power generated by the selected WTG(s) 14 based on the auxiliary load, and/or a state of charge of the BESS 15. The determined set points may be dispatched to the WTG controller(s) 17 associated with the selected WTG(s) 14 for controlling the power generation accordingly.

It shall be appreciated that the set points may, for example, cause the power generated from the selected WTG(s) 14 to increase in a controlled manner to a reference power level, such as a rated power output for the selected WTG(s) 14, at which the selected WTG(s) may be operated until the second energy storage condition is satisfied as described in more detail below.

In step 220, the generated power is used to power the auxiliary load of the WPP 12, thereby maintaining each, or at least one, of the remaining WTGs 14 in the standby state and, in step 222, the energy storage system is controlled to recharge using the generated power, for example by recharging the BESS 15 or otherwise increasing the amount of energy stored.

Considered in more detail, as the power generation from the selected WTG(s) 14 increases under the control of the PPC 22, the PPC 22 may detect, in step 220, that the power generated by the selected WTG(s) 14 is greater than, or equal to, the auxiliary load, and the PPC 22 may therefore control or otherwise allow the BESS 15 to stop discharging energy. Thereafter, as the power generated from the WTG(s) increases further, the PPC 22 may operate or allow the BESS 15, in step 222, to receive the surplus power, i.e. the generated power in excess of the demands of the auxiliary load, and recharge the energy storage system. The selected WTGs 14 may subsequently be operated to generate a substantially constant power output equal to the sum of the auxiliary load and the power used to recharge the BESS 15.

In this manner, although the auxiliary load may be below the rated power output of the selected WTG(s), the additional power demand of the BESS 15 means that the selected WTG(s) 14 may be operated with reduced, or entirely without, curtailment, and may be operated at the rated power output for example. In this manner, the BESS 15 may act like an accumulator such that the mechanical loads exerted on the selected WTG(s) are less damaging during the non-exporting mode of operation.

Whilst the selected WTG(s) 14 are generating power, the PPC 22 also determines, in step 224, whether the second energy storage condition is satisfied. For example, the PPC 22 may determine whether the state of charge of the BESS 15 has reached the second threshold, and/or whether the selected WTG(s) 14 have been generating energy for the respective duty period. For example, the PPC 22 may start recording the time elapsed once the selected WTG(s) 14 are charging the BESS 15 at, or above, a threshold rate and determine that the second charging condition is satisfied once the duty period has subsequently elapsed. As mentioned previously, the duty period may be stored in the memory module 32 of the PPC 22 and correspond to an energy storage capacity, charge rate of the BESS 15 or condition of the selected WTG(s) 14.

Whilst the second energy storage condition remains unsatisfied, the PPC 22 may continue to control the selected WTG(s) 14, via the respective WTG controller(s) 17, to power the auxiliary load and charge the BESS 15, as described in steps 220 and 222.

However, once the PPC 22 detects that the second charge condition is satisfied, the PPC 22 may stop operating the selected WTG(s) 14 to generate power, in step 226, and the BESS 15 may resume the discharge of stored energy, in a subsequent cycle, in order to power the auxiliary load, as described in step 204.

Considered in more detail, the PPC 22 may be configured to monitor the power generation from the selected WTG(s) 14, in step 226, as they are controlled to stop generating power and, once the power generated by the selected WTG(s) falls to, or below, the auxiliary load, the PPC 22 may control or otherwise allow the BESS 15 to resume discharging energy, in step 204, thereby powering the auxiliary load.

In this manner, the method 200 may cyclically discharge the BESS 15, and recharge the BESS 15 using a selection of WTG(s) 14, to maintain the WTGs 14 in a standby state during the non-exporting mode of operation. The WPP 12 can therefore operate safely in the absence of an energy demand and, in response to a change in demand, the WTGs 14 can be operated to independently perform a start-up or black start and re-enter the power producing mode of operation, eliminating the need for non-renewable energy sources, such as a diesel generator.

For this purpose, the BESS 15 may also be synchronised and connected to the main grid 16 (e.g. using a sync relay), ramping down the discharge power and stopping BESS 15 operation (if grid ancillary service is not needed).

Figure 5:
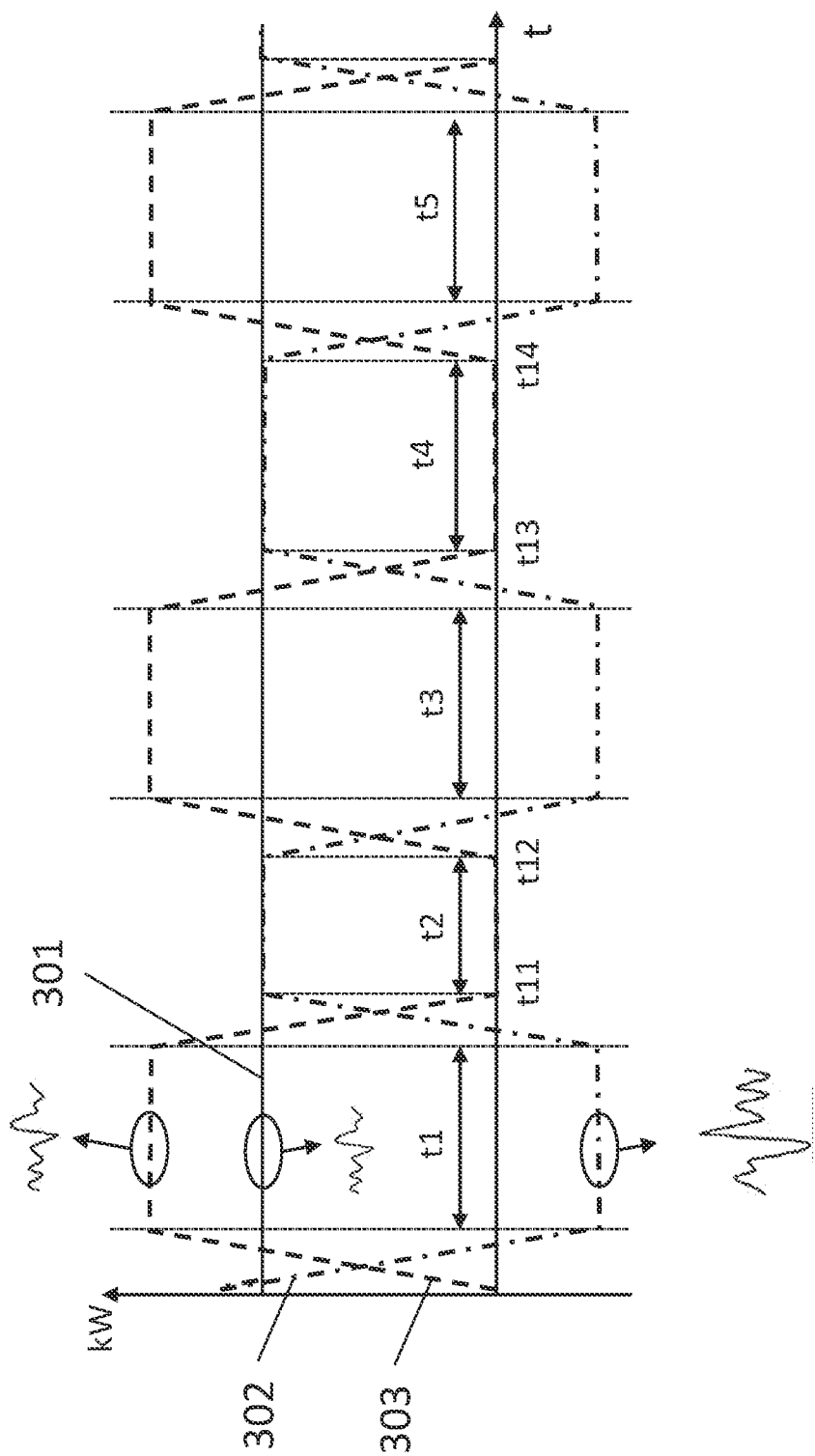
FIG. 5 shows a chart illustrating the operation of the renewable energy power plant of FIG. 1 according to the method shown in FIG. 3.

For further context, FIG. 5 shows a chart illustrating the balance of power between the auxiliary load, the power generated by the selected WTG(s) 14 and the power output from the BESS 15 during the non-exporting mode of operation, according to the method 200 described above.

FIG. 5 may be considered to illustrate a situation where, following loss of connection to the grid, the WPP 12 enters an island mode of operation, for example.

The chart depicts a first line 301 illustrating the auxiliary load; a second line 302 illustrating the power supply from the BESS 15; and a third line 303 illustrating the power supply from the selected WTG(s) 14.

For this example, multiple charging and discharging cycles are shown and the method further includes selecting a different WTG 14 for each successive cycle, as shall be described in more detail below.

As shown in FIG. 5, at grid loss instance, the WPP 12 is disconnected from the main grid 16 and the WTGs 14 are controlled to stop generating power, thereby entering the non-exporting mode of operation, as described in step 202 of the method 200.

During the non-exporting mode of operation, the auxiliary systems of the WPP 12 are continuously operated, as shown in FIG. 5, to maintain the WTGs 14 in the standby state. Hence, the auxiliary load, shown by the first line 301, is substantially constant throughout the non-exporting mode of operation, with the detailed view of FIG. 5 showing low magnitude fluctuations as the various auxiliary systems perform respective operations.

Initially, the auxiliary load is powered by discharging stored energy from the BESS 15, as described in step 202, with the second line 302 showing an initial power output that is sufficient to power the auxiliary load, represented by the first line 301.

However, in the example shown here, the PPC 22 may detect, in step 206, that the first energy storage condition has already been satisfied upon entering the non-exporting mode of operation. On this basis, the PPC 22 may select a first WTG 14, in step 208, and operate the first WTG 14 to start generating power. Accordingly, the third line 303 is shown to increase as the first WTG 14 is started.

As the first WTG 14 is started, the BESS 15 may continue to discharge energy, as shown in FIG. 5, so that the first WTG 14 and the BESS 15 power the auxiliary load together, in step 220, with the power generated by the first WTG 14 increasing, as shown the by the third line 303, and the power discharged from the BESS 15 decreasing, as shown by the second line 302.

When the power generated by the first WTG 14 reaches the auxiliary load, shown by the first line 301, the BESS 15 may be controlled to stop discharging energy and, instead, the BESS 15 may be controlled or otherwise allowed to start receiving energy from the first WTG 14, in step 222, as shown by the negative line 302 in FIG. 5.

Thereafter, for the period labelled t1, the first WTG 14 may therefore be operated, according to steps 220 and 222, to power the auxiliary load and to recharge the BESS 15. The period labelled t1 represents the duty period of the first WTG 14 and, during this period, the first WTG 14 may be curtailed, as shown in FIG. 5, such that the first WTG 14 generates a substantially constant power output equal to the sum of the auxiliary load and the power used to recharge the BESS 15. In particular, as shown in FIG. 5, the line 303 is substantially constant during the duty period, with only minor fluctuations that are illustrated in the detail view of FIG. 5.

Upon expiry of the duty period, i.e. at the end of the period, t1, the PPC 22 may determine, in step 224, that the second energy storage condition has been satisfied. Accordingly, the PPC 22 may stop operating the first WTG 14 to generate power, in step 226, and start operating the BESS 15 in a subsequent cycle to start discharging stored energy to power the auxiliary systems, as described in step 204. Here it can be seen that the PPC 22 may control or otherwise allow the BESS 15 to start discharging energy as the power generated by the first WTG 14, shown by the third line 303, is controlled to a stop and falls below the auxiliary load, shown by the first line 301, such that the total power input satisfies the auxiliary load. Once the first WTG 14 has completely stopped, at the time t11, and is no longer generating power, the BESS 15 is shown by the second line 302 to discharge energy to power the auxiliary load.

Thereafter, it shall be appreciated that the BESS 15 continues to power the auxiliary load for the discharge period, labelled t2 in FIG. 5, until the PPC 12 again determines, in step 206, that the first energy storage condition is satisfied, at the time t12. For the second cycle, i.e. for the period labelled t3, the PPC 22 may select another WTG 14, in particular a second WTG 14, to start operating, in step 208, which powers the auxiliary load and recharges the BESS 15, according to steps 220 and 222, during the second duty cycle.

The process may continue through the subsequent cycles (t4 to t5), shown in FIG. 5, in substantially the same manner, cycling through, or otherwise selecting from, the plurality of WTGs 14 to recharge the BESS, and power the auxiliary load, as necessary. At the end of the non-exporting mode of operation, for example at the instance of grid restoration, the WTGs 14 may therefore be operated from the standby state to black-start the WPP 12.

It shall be appreciated that the parameters of the first and second energy storage conditions may vary in dependence on the conditions, or the mode of operation. For example, when the WPP 12 is disconnected from the main grid 16 and operated in an island mode of operation, the first energy storage condition may be set as a minimum charge capacity of the BESS 15, the second energy storage condition may be set as a maximum charge capacity of the BESS 15, and the set points dispatched to the WTG controller(s) 17 may be determined for curtailing the power generation from the respective WTGs 14 accordingly. However, when the WPP 12 remains connected to the main grid 16, and is operated in a net zero-mode of operation, the first energy storage condition may be set by a lower threshold that is greater than the minimum charge capacity of the BESS 15, the second energy storage condition may be set by an upper threshold that is less than the maximum charge capacity of the BESS 15, and the set points dispatched to the WTG controller(s) 17 may be determined for controlling the power generation from the respective WTGs 14 to the rated power, for example.

It shall also be appreciated that, although the PPC 22 has been described as controlling the BESS 15 to discharge and/or to receive energy, in examples, the PPC 22 may simply control the BESS 15 to operate in a particular mode, such as a grid forming mode, whereby the BESS 15 is connected to the equipment of the WPP 12 such that energy is either drawn from, or transferred to, the BESS 15 in dependence on the shortfall, or excess, of energy produced by the WTGs 14 for powering the auxiliary load.

It will be appreciated that various changes and modifications can be made to the present invention without departing from the scope of the present application.

In an example, the PPC 22 may control the BESS 15, in step 204, to apply conservative voltage reduction (CVR) for the auxiliary load. For example, during grid connected operation, CVR may be applied to maintain a power factor at the PCC. CVR application is well-known in the art and is not described in detail here to avoid obscuring the invention, but may be used to enable the operation of loads at lower power consumption, as shall be appreciated by the skilled person.

The invention claimed is:

1. A method of controlling a renewable energy power plant comprising a plurality of wind turbine generators (WTG)s and an energy storage system (ESS), the method comprising:
   controlling the plurality of WTGs to stop generating power, and thereby to enter a non-exporting mode of operation of the renewable energy power plant, during which one or more auxiliary systems of the renewable energy power plant are powered to maintain at least one of the plurality of WTGs in a standby state, operable to start generating power upon demand;
   wherein the one or more auxiliary systems are powered during the non-exporting mode of operation by:
   discharging stored energy from the ESS;
   detecting when a first energy storage condition is satisfied;
   operating one or more of the WTGs to start generating power in dependence on detecting that the first energy storage condition is satisfied, the power generated by the one or more WTGs being used to power the one or more auxiliary systems;
   operating the ESS to recharge using the power generated by the one or more WTGs;
   detecting when a second energy storage condition is satisfied; and
   operating the one or more WTGs to stop generating power in dependence on detecting that the second energy storage condition is satisfied.

2. The method of claim 1, wherein detecting that the first energy storage condition is satisfied comprises detecting that at least one of:
   a discharge period has elapsed; and/or
   the energy stored in the ESS has reduced to a first threshold state of charge.

3. The method of claim 1, wherein detecting that the second energy storage condition is satisfied comprises detecting that at least one of:
   a duty period for the one or more WTGs has elapsed; and/or
   the ESS has recharged to a second threshold state of charge.

4. The method of claim 3, wherein the second threshold state of charge is a maximum charge capacity of the ESS.

5. The method of claim 1, further comprising at least one of:
   stopping the discharge of stored energy from the ESS when the power generated by the one or more WTGs is greater than, or equal to, the power demand of the one or more auxiliary systems; and/or
   resuming the discharge of stored energy from the ESS when the power generated by the one or more WTGs is less than the power demand of the one or more auxiliary systems.

6. The method of claim 1, further comprising curtailing the one or more WTGs that are operated to generate the power for recharging the ESS and powering the auxiliary load.

7. The method of claim 6, wherein curtailing the one or more WTGs comprises:
   determining an average power demand of the one or more auxiliary systems; and
   determining and dispatching active power set points for controlling the one or more WTGs, the set points being determined based, at least in part, on the determined average power demand.

8. The method of claim 1, further comprising selecting which one or more WTGs of the plurality of WTGs to operate so as to start generating power, wherein the selection is made based on at least one of the following for each WTG:
   information that is indicative of available power at the WTG; and/or
   information that is indicative of a fatigue life of the WTG.

9. The method of claim 8, wherein the information that is indicative of available power at the WTG comprises a wind speed and/or a wind direction at the WTG.

10. The method of claim 8, wherein the information that is indicative of the fatigue life of the WTG comprises at least one of:
    a load cycle history of the WTG;
    a fatigue limit of the WTG; and/or
    a load capacity of the WTG.

11. The method of claim 8, wherein the renewable energy power plant is controlled to cyclically discharge the ESS and to recharge the ESS using the selected one or more WTGs, and thereby to power the one or more auxiliary systems during the non-exporting mode of operation.

12. The method of claim 11, wherein, for each successive cycle, the method comprises selecting another one or more WTGs of the plurality of WTGs to operate so as to start generating power.

13. The method of claim 1, further comprising: initiating the non-exporting mode of operation in dependence on entering:
    an island mode of operation following disconnection of the renewable energy power plant from a power network; and/or
    a net-zero mode of operation.

14. The method of claim 1, further comprising selectively operating the at least one WTG from the standby state to black-start the renewable energy power plant, and thereby to re-enter a producing mode of operation.

15. A power plant controller, comprising:

an input/output (I/O) interface; and one or more processors communicatively coupled to the I/O interface and configured to perform an operation for controlling a renewable energy power plant comprising a plurality of wind turbine generators (WTG)s and an energy storage system (ESS), the operation, comprising:

controlling the plurality of WTGs to stop generating power, and thereby to enter a non-exporting mode of operation of the renewable energy power plant, during which one or more auxiliary systems of the renewable energy power plant are powered to maintain at least one of the plurality of WTGs in a standby state, operable to start generating power upon demand; wherein the one or more auxiliary systems are powered during the non-exporting mode of operation by:

discharging stored energy from the ESS;

detecting when a first energy storage condition is satisfied;

operating one or more of the WTGs to start generating power in dependence on detecting that the first energy storage condition is satisfied, the power generated by the one or more WTGs being used to power the one or more auxiliary systems;

operating the ESS to recharge using the power generated by the one or more WTGs;

detecting when a second energy storage condition is satisfied; and operating the one or more WTGs to stop generating power in dependence on detecting that the second energy storage condition is satisfied.

* * * * *